May 26, 1970  R. GIANNAMORE  3,514,689
THREE-PHASE AC-OPERATED DC POWER SUPPLY
Filed Aug. 21, 1968  6 Sheets-Sheet 5
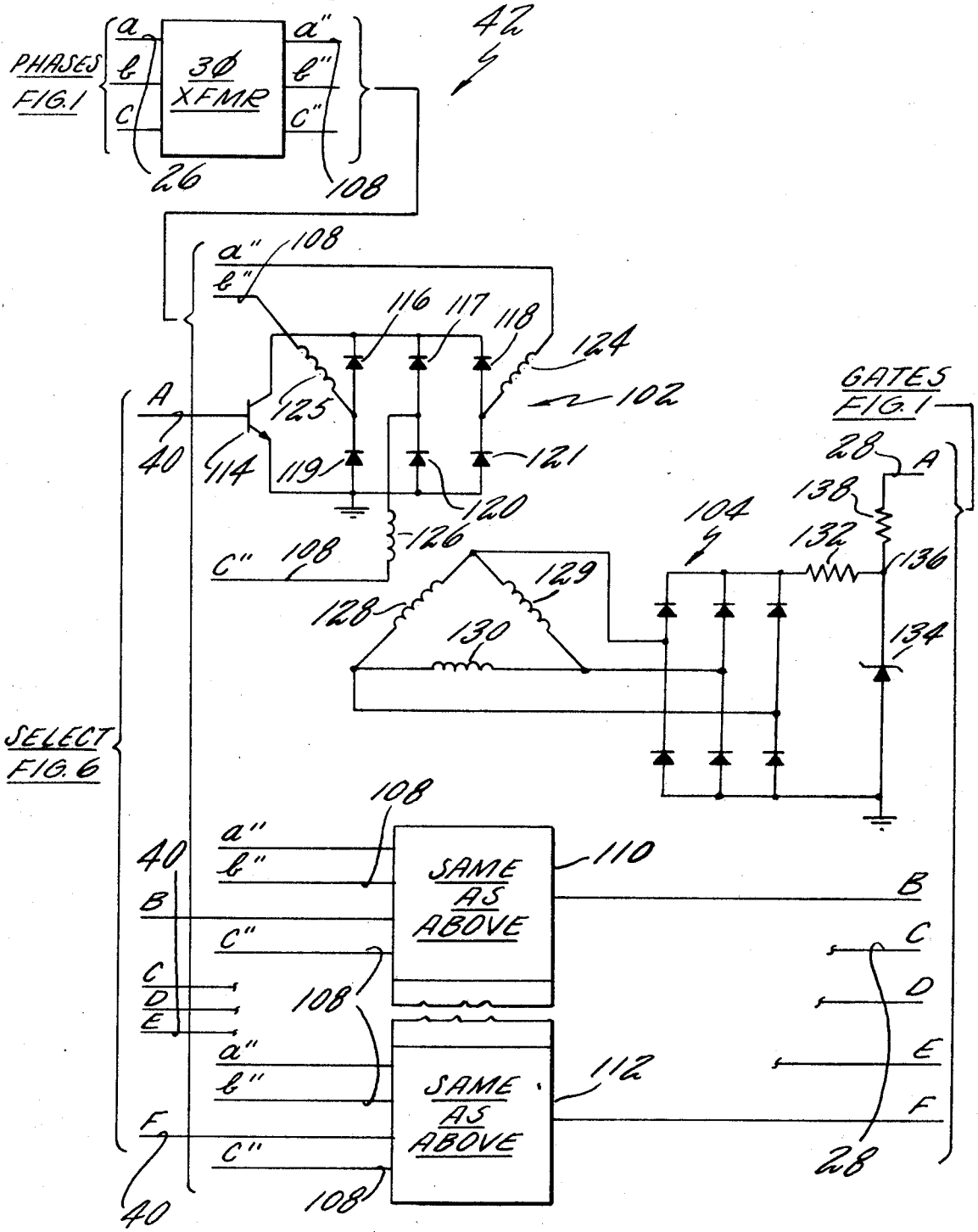

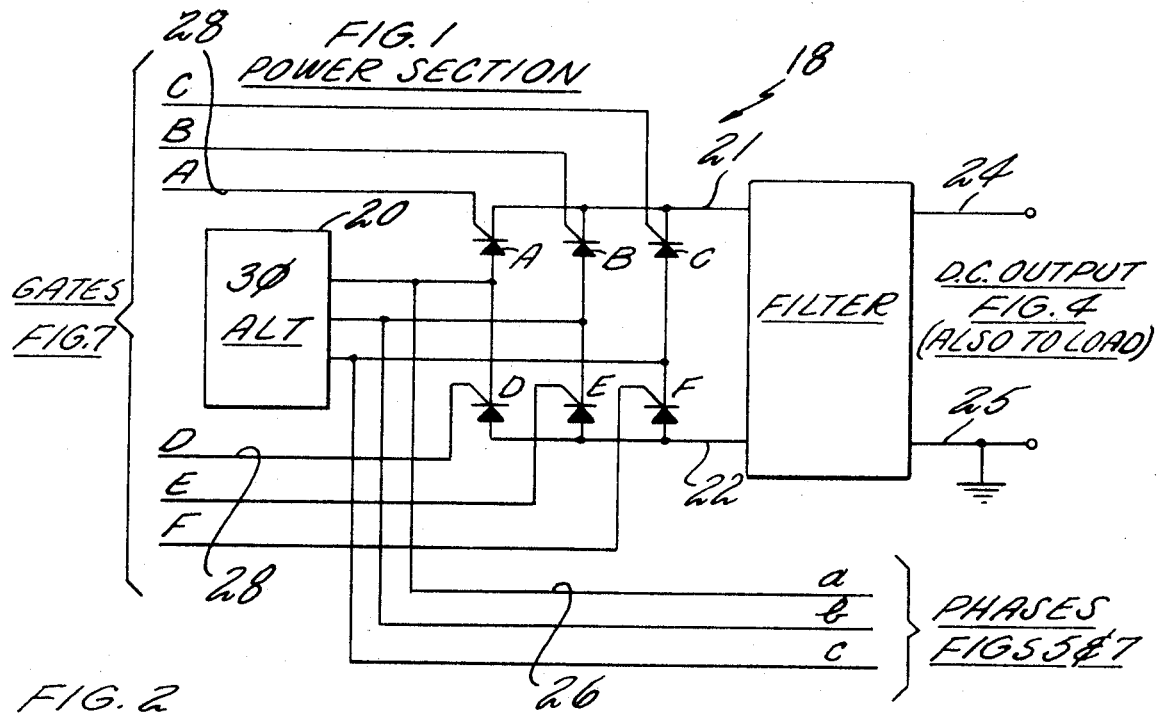

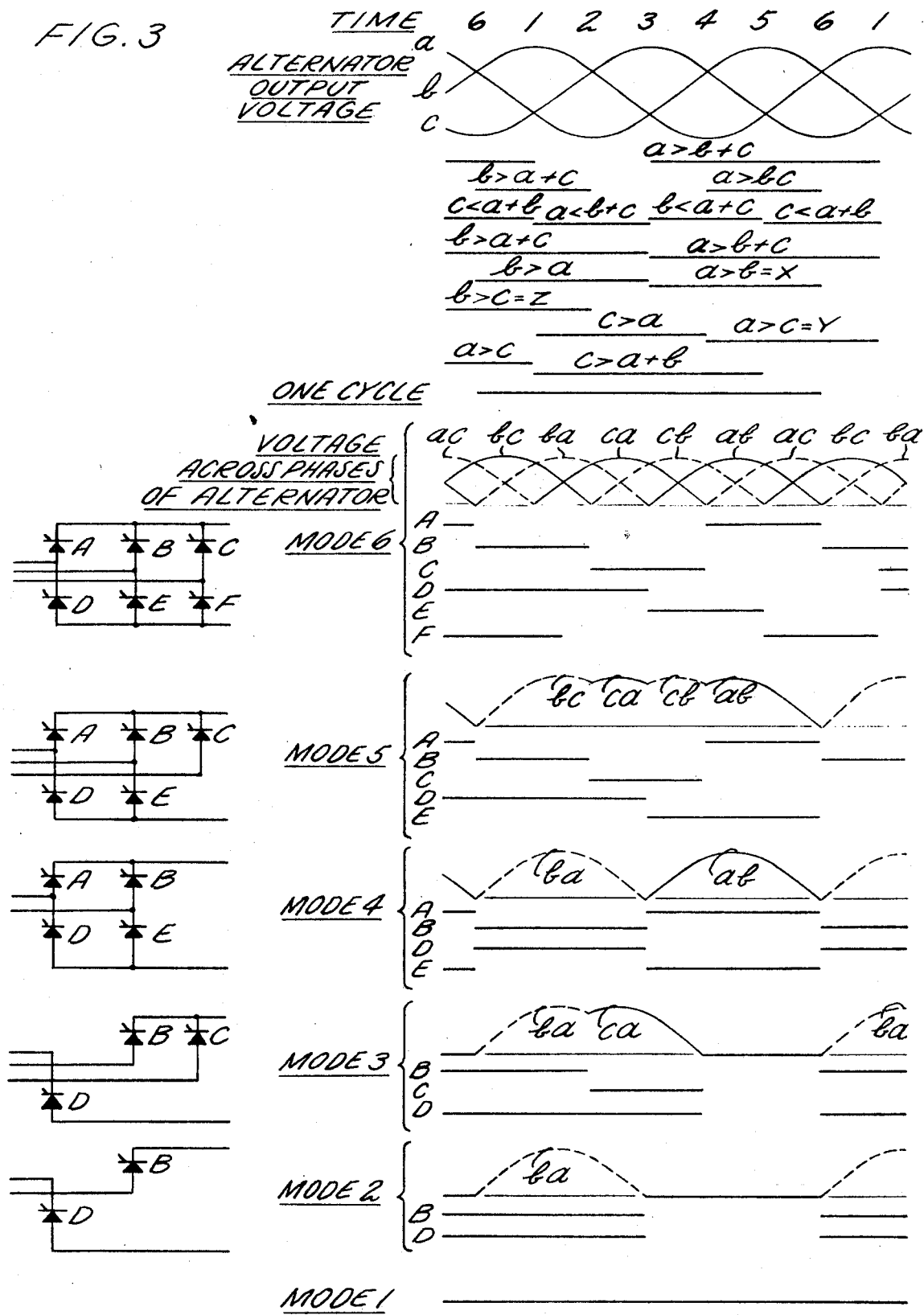

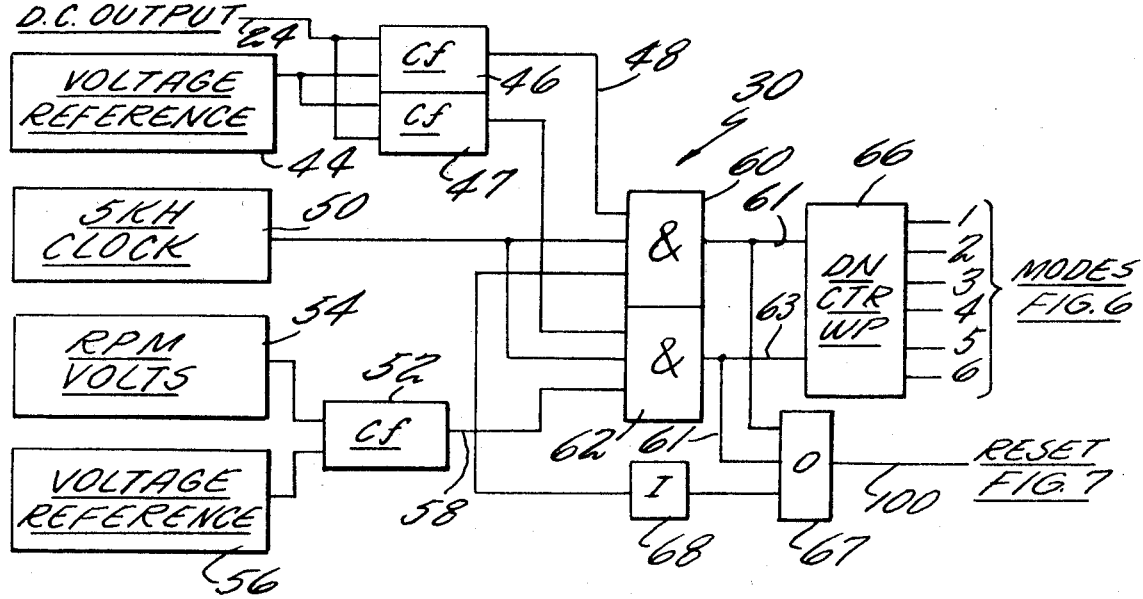
FIG. 4 MODE DEFINITION
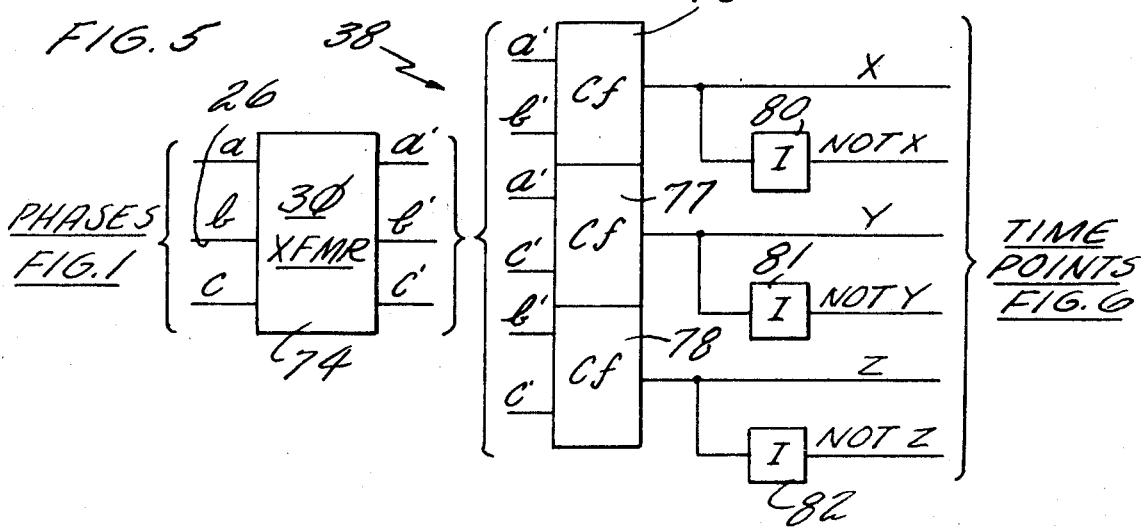
FIG. 5

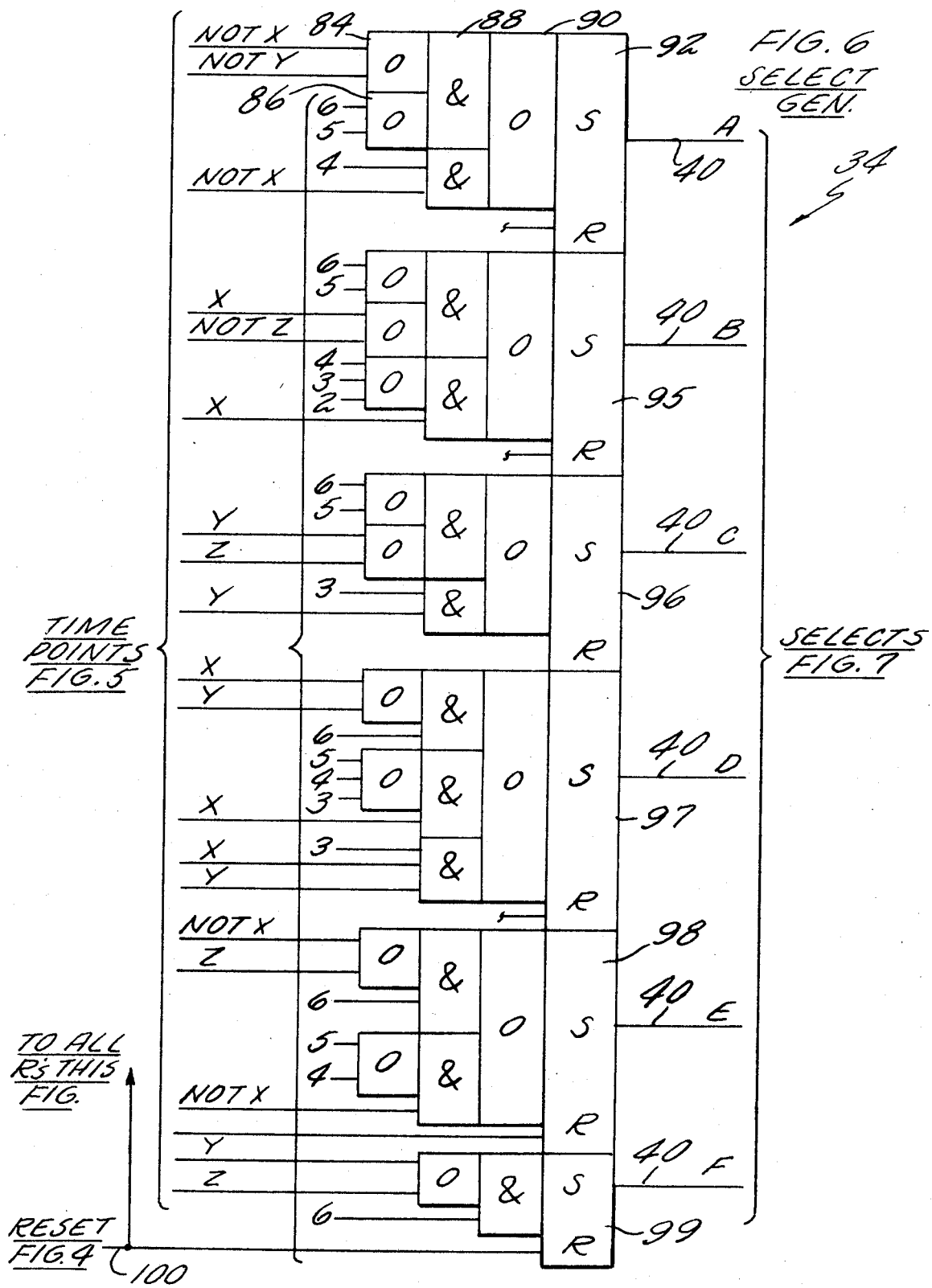

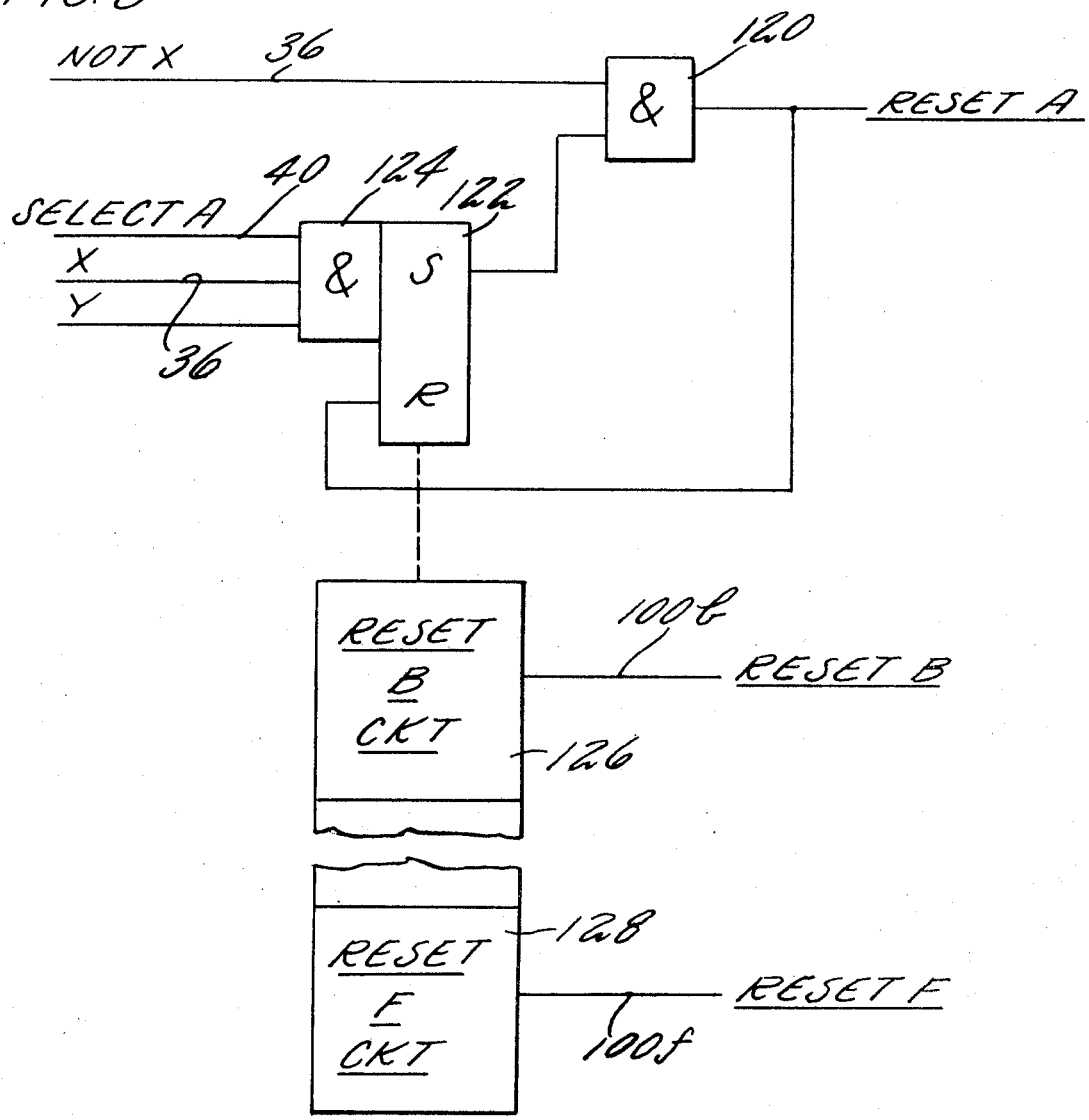

United States Patent Office 3,514,689
Patented May 26, 1970

3,514,689
THREE-PHASE AC-OPERATED DC POWER SUPPLY
Ronald Giannamore, Wapping, Conn., assignor to United Aircraft Corporation, East Hartford, Conn., a corporation of Delaware
Filed Aug. 21, 1968, Ser. No. 754,411
Int. Cl. H02m 7/00, 1/08
U.S. Cl. 321—5                                                6 Claims

ABSTRACT OF THE DISCLOSURE

Selectively gated parametric rectification of three-phase alternating current supplies a DC power output which is voltage regulated by controlling the number of phases which conduct during each cycle. The main current switches are controlled so as to commence conduction during zero crossover, thereby to maintain R.F.I.—radio frequency interference—generation at a minimum. Zero crossover turn-on is guaranteed by switch gate signals which control the current switches, the gate signals being permissibly timed in dependence upon comparison of the three-phase wave form which indicates the effective point in time within a cycle.

---

The invention herein described was made in the course of a contract with the Department of the Air Force.

BACKGROUND OF THE INVENTION

Field of art

This invention relates to power supplies, and more particularly to apparatus for converting three-phase AC to controlled DC.

Description of the prior art

It has long been known in the art that an AC powered, DC power supply may have its output voltage regulated by the period of time that each of the phases is allowed to conduct during a given cycle. Such supplies have had a high R.F.I. content as a result of allowing switches to ocmmence or ceases conduction when the voltage across the switches is not zero. To overcome this, single-phase systems have been developed which utilize either both halves of the AC voltage wave, or one-half of it, the conduction of either half cycle being controlled so as to commence at the zero voltage crossover point, whereby no sharp steps in the voltage occur thereby minimizing odd harmonic content. However, three-phase-to-DC systems known in the art utilize all phases at all times, but control the period of time in which each phase is allowed to conduct.

SUMMARY OF THE INVENTION

The object of the present invention is to provide three-phase-AC to DC power supply which does not rely on partial wave conduction for voltage regulation, and which generates a DC output with low R.F.I. content.

According to the present invention, the output voltage of a three-phase AC to DC converter is compared against the reference, and main current carrying switches are selectively enabled to conduct so as to present a greater or fewer number of the rectified three-phases in each cycle, in dependence upon whether the voltage is to be increased or decreased, respectively; conduction of any of the main current carrying switches is commenced at the points where the voltage across the switch crosses zero, thereby to avoid step function changes in voltage and commensurate R.F.I. content. Timing of the system is controlled by the combination of a desired mode indicator with a three-phase voltage comparison to identify various periods of time within a cycle when switch turn-on may be effected without R.F.I. generation.

The invention permits a close degree of control over output voltage, being capable of responding within a cycle, and a larger variety of phase combinations are available for voltage control than has heretofore been available with low R.F.I. power supplies of the prior art.

The foregoing and other objects, features and advantages of the present invention will become more apparent in the light of the following detailed description of preferred embodiments thereof, as illustrated in the accompanying drawings.

BRIEF DESCRIPTION OF THE DRAWINGS

FIG. 1 is a schematic block diagram of the power section, including the main current switches, of an AC to DC converter in accordance with the present invention;

FIG. 2 is a block diagram of an AC to DC converter system in accordance with the present invention;

FIG. 3 is a timing diagram illustrating the various phases of voltage that obtain within the system of the present invention, together with related illustrations of switches used in various operating modes;

FIG. 4 is a schematic block diagram of apparatus for defining the modes in which the present invention may operate;

FIG. 5 is a schematic block diagram of apparatus for determining points in time within the cycle;

FIG. 6 is a schematic block diagram of illustrative digital logic circuitry which may be utilized to compare desired modes with points in time thereby to generate select signals for controlling the operation of the main current switches of FIG. 1; and FIG. 7 is a schematic block diagram, partially broken away, of circuitry responsive to phase and select signals for generating gating signals for the current switches of FIG. 1.

DESCRIPTION OF THE PREFERRED EMBODIMENT

Referring now to FIG. 1, the main power section of a three-phase AC to DC power supply in accordance with the present invention is seen to be similar to a simple three-phase to DC power supply known to the prior art. In the present invention, it is the control of the main current switches of FIG. 1 which represents the invention and provides the advantages to be derived.

As illustrated in FIG. 1, the main source of power in accordance with the present invention is a three-phase alternator 20 which may be driven by a variable speed motor, such as the engine in an aircraft, or by any other suitable source. For purposes of illustration herein, it is assumed that the three-phase alternator 20 is in a Y configuration, the respective points of the Y being designated as *a*, *b*, and *c*. The output of the alternator 20 is connected to a three-phase parametric rectifying bridge containing six main current switches: A, B, C, D, E, and F. Each of the switches may comprise a silicon controlled rectifier, or as is described hereinafter, with certain modifications, may comprise a bi-polar or field effect transistor. The output of the bridge on lines 21 and 22 may preferably be fed through a filter 23 so as to supply DC power on a pair of output lines 24, 25, the output line 25 capable of being grounded, if so desired. The filter may be stimulated wherever the load does not require it. The output of the three-phase alternator 20 is also made available for powering other portions of this embodiment of the invention over a plurality of lines 26. Control over the switches A–F is in response to gate signals applied over a plurality of corresponding gate signal lines 28.

Although the power section of FIG. 1 is similar to those known to the prior art, it can be seen with respect to the system block diagram of FIG. 2 that its operation is vastly different. In FIG. 2, the DC output power line 24 is applied to a mode definition circuit 30 (illustrated in FIG. 4), the output of which comprises signals on five lines 32 for application to a select generator 34, which is illustrated in FIG. 6. The select generator 34 also receives six different point-in-time signals over a plurality of lines 36 from a time point generator 38, which is illustrated in FIG. 5. The time point generator 38 is in turn responsive to the three-phase signals (a, b, c) over the lines 26. The mode definition circuit 30 compares the actual output voltage with the desired output voltage, and the time point generator 38 defines the present point in time within a cycle, so that the select generator 34 can determine which of the switches A–F should be operated so as to cause an increase or decrease in output voltage as required, without step function R.F.I. generation. This is done by supplying any one of six select signals over a plurality of lines 40 to a gate generator 42 which in turn supplies six gate signals (corresponding to switches A–F) over the plurality of lines 28 to the power section 18 (shown in FIG. 1).

A detailed description of the operation of the invention and the various circuits of FIGS. 4–7 is given hereinafter.

Referring now to FIG. 3, a plurality of functions are plotted on the same time base with the alternator output voltage. These have arbitrarily been numbered, for reference, times 1, 2 . . . 6. It is to be noted that one complete cycle exists between time 1 and time 6. In the upper portion of FIG. 3, the output of the alternator is plotted. It should be recalled that these are the potentials of the Y configuration output, so that the useful phases are found between these potentials. these are plotted below, in conjunction with mode 6, under the heading, "Voltage Across Phases of Alternator." In this plot, as well as throughout FIG. 3, the dotted lines indicate waves that are inverted by the main power switch configuration (FIG. 1) and as a convention, the in-phase components are taken to be $ab$, $bc$, and $ca$; the out-of-phase components are referred to as $ac$, $cb$, and $ba$, and are shown dotted in FIG. 3. It should also be borne in mind that, although the actual output power is based on the voltages between two points of the Y-configurated alternator ($ab$, $bc$, etc.) the point in time generator 38 operates by comparing the output "$a$" with the output "$b$" and the output "$c$" directly.

The various modes in which the present invention may operate are illustrated in FIG. 3. In mode 6, six half cycle waves are used back-to-back so as to supply a full, three-phase parametric rectified output. This supply is the highest output voltage possible in any given circumstance. All six switches A–F (FIG. 1) are used in this mode. Mode 5 supplies a somewhat smaller voltage output than mode 1, by eliminating two of the half cycles of rectified three-phase power as seen in the center of FIG. 3. Switch F is not used in this mode; A–E are used. In mode 4, only two half waves are utilized so that an even smaller output voltage will result. Switches A, B, D, and E are used in this mode. Mode 3 uses two half waves overlapping each other so as to supply a result intermediate that of mode 4 or mode 2 using switches B, C, and D. Mode 2 is a single half wave, using only switches B and D. Mode 1 is no output at all, and necessarily results in the lowest possible output voltage: no switches operate in this mode.

Thus the principal aspect of the present invention is to provide six different modes, the highest mode supplying the highest voltage and using all of the switches, and each successively lower order mode supplying a slightly lower voltage and utilizing one less switch. In other words, the present invention provides a power supply whose basic mode of operation is the same as having various configurations of the rectifier switches available. This is similar to having either six rectifiers or five rectifiers and so forth. The object of the present invention is therefore to control the main current switches A–F of FIG. 1 so as to permit conduction of suitable half cycle wave forms in order to meet the definitions of any of the modes 1–6 so as to tend to compensate for an output voltage which is too high or too low at any given point in time. While the converter in accordance herewith is operating, it may slide between any given mode and any higher mode, or between any given mode and any lower mode, as necessary in dependence upon whether increased or decreased output voltage, respectively, is desired. Of course, switching between various modes by allowing a greater or fewer number of the rectifier switches to operate, if done in an uncontrolled fashion, could result in R.F.I generation as a result of switches being turned on, for instance, during the middle of a phase which is to conduct, thereby resembling the systems of the prior art where phases are indiscriminately turned on and off as necessary to regulate the output voltage. Therefore, according to the invention, control of the current switches A–F of FIG. 1 is carefully regulated with respect to time so that each of the switches turns on and begins conducting at a point where the cathode to anode potential there-across is zero; in other words, turn-on of the current switches in all cases occurs at a zero voltage crossing point, as is described more fully hereinafter.

Referring to FIGS. 1 and 3, notice that regardless of which pair of switches is conducting at any given time, the cathodes of switches A, B, and C will be at the potential of the particular phase ($a$, $b$, or $c$) which corresponds with the conducting rectifier, and similarly, the anodes of switches D, E, and F will all be at the potential of one of the phases in dependence upon which of these are conducting. Therefore, conduction of each of the switches A–F depends upon the potential established at its cathode or its anode by a currently conducting related one of the switches. Referring to FIG. 3, mode 6, consider initially the time period between time 6 and time 1. During this time, the switches B and F are conducting. This means that the cathodes of switches A and C are at the same potential as the cathode of switch B, and, because it is conducting, its cathode is at essentially the same potential as its anode, which is connected to phase $b$ of the three-phase alternator 20. The switch B will continue to conduct as long as its anode is not driven negative with respect to its cathode, so that it can conduct through the time period between time 1 and time 2. At time 1, phase $a$ becomes more negative than phase $c$, and assuming that gate D is available at the control electrode of switch D, switch D will begin to conduct, which causes the anodes of switches D, E, and F all to be at the potential of phase $a$. After time 1, that is the period between time 1 and 2, phase $a$ is more negative than phase $c$, and since phase $c$ is connected to the cathode of switch F, and the anode of switch F is at the more negative potential of phase $a$, switch F no longer conducts. Thus, the time period between times 1 and 2 finds switch B conducting and switch D conducting. When time 2 is reached, phase $c$ becomes more positive than phase $b$, and phase $c$ is positive with respect to phase $a$, which is connected to the ground side of the output 25 through rectifier D, so that switch C can commence to conduct if gate signal C is available at the control electrode thereof. Once switch C commences conduction, then all three cathodes of switches A, B, and C are essentially at the same potential as phase $c$, and phase $c$ being more positive at that point than phase $b$, switch B ceases conduction. And so the operation continues, through each of the half waves of all three phases during operation in mode 6.

In order to prevent the turn-on of any of the switches A–F except when the potential between its anode and its cathode is changing from a negative to a positive potential, through zero (thereby to avoid step function voltage changes which result in R.F.I. generation), the gate signals A–F on lines 28 are not permitted to *first* appear during the times when a corresponding anode to cathode potential is positive. Thus, in the time periods just described, the gate signal D is permitted at all times except between time periods 1 and 3. In other words, this signal is permitted to be established whenever alternator output phase $a$ is more positive than phase $b$, or it is more positive than phase $c$. This covers a portion of a cycle from time period 3 to time period 1 in FIG. 3, and as illustrated below the alternator output voltage wave form, is defined as $a>b+c$. Once a gate signal is established, it may remain on forever, if operating conditions call for it.

In a similar fashion, for each of the modes, each of the gate signals for switches A–F is permitted to be turned on when a given mode is currently selected during any of the times when the related switch cannot possibly conduct, and is not permitted to have a gate signal first applied to it during the periods of time when it can conduct since it may then conduct after some significant potential exists across the switch, giving rise to R.F.I. generation.

A summary of the times that the various gate signals are permitted to be generated during the various modes of operation is shown in Table I, wherein the following definitions apply:

TABLE I $a>b=x$
$a>c=y$
$b>c=z$
$b>a=$ not $x=\bar{x}$
$c>a=$ not $y=\bar{y}$
$c>b=$ not $z=\bar{z}$

| | Gate | Time | Logic | Digital function |
|---|---|---|---|---|
| Mode: | | | | |
| 6 | A | $a<(b+c)$ | $b>a+c>a$ | $\bar{x}+\bar{y}$ |
| | B | $b<(a+c)$ | $a>b+c>b$ | $x+z$ |
| | C | $c<(a+b)$ | $a>c+b>c$ | $y+z$ |
| | D | $a>(b+c)$ | $a>b+a>c$ | $x+y$ |
| | E | $b>(a+c)$ | $b>a+b>c$ | $\bar{x}+z$ |
| | F | $c>(a+b)$ | $c>a+c>b$ | $\bar{y}+\bar{z}$ |
| 5 | A | $a<(b+c)$ | $b>a+c>a$ | |
| | B | $b<(a+c)$ | $a>b+c>b$ | |
| | C | $c<(a+b)$ | $a>c+b>c$ | |
| | D | $a>b$ | | $x$ |
| | E | $b>a$ | | $\bar{x}$ |
| 4 | A | $b>a$ | | $\bar{x}$ |
| | B | $a>b$ | | $x$ |
| | D | $a>b$ | | $x$ |
| | E | $b>a$ | | $\bar{x}$ |
| 3 | B | $a>b$ | | $x$ |
| | C | $a>c$ | | $y$ |
| | D | $a>(bc)$ | $(a>b)(a>c)$ | $xy$ |
| 2 | B | $a>b$ | | $x$ |
| | D | $a>b$ | | $x$ |
| 1 | | | | |

In order to recognize times when it is permissible to initially generate gating signals for the various switches A–F of FIG. 1, as described hereinbefore with respect to FIG. 3, it is necessary to recognize the various points of time within a cycle. This is done, as before described, by comparing the voltages of the various phases of the alternator output, which is done herein simply in terms of combinations of $x$, $y$, and $x$ set out in the definitions before Table I. This is implemented in the time point generator illustrated in FIG. 5, and is described in detail hereinafter.

Referring now to FIG. 4, the mode definition circuitry 30 compares the DC output voltage 24 with a voltage reference 44 in a pair of voltage comparison circuits 46, 47. This is a comparison of arithmetic amplitude: that is, the compare circuits 46, 47, merely determine whether the output voltage is higher or lower than the voltage reference 44. In the embodiment shown in FIG. 4, it is assumed that an output signal will appear on a line 48 whenever the output voltage 24 is higher than the voltage reference 44, and that a signal will appear on line 49 whenever the output voltage 24 is lower than the voltage reference 44. The voltage reference 44 may comprise a rectified portion of the alternator output together with a Zener diode, or any other well-known form of voltage reference. Similarly, the voltage comparator 46 may be of any well-known variety, so long as it can deliver a signal indicative of how the output voltage compares with the reference.

Dynamic timing of the mode definition circuit 30 shown in FIG. 4 is under the control of a clock circuit 50, which may, for instance, supply five kilohertz signls on a line 51. Other frequencies may be chosen, but in the embodiment shown herein, the frequency of the clock 50 should be high with respect to the frequency of the alternator 20 (FIG. 1).

Another voltage comparator 52 may be used if desired, although it isn't essential to the operation of the present invention. This voltage comparator 52 compares a voltage indicative of the speed of the alternator 20 (or aircraft engine speed, if appropriate), from an r.p.m. volts indicator 54, with another voltage reference 56. The output of the comparator 52 on a line 58 may then be considered to be an indication of the system being in operation above a given speed, below which the system does not portend to operate correctly. In other words, one may define that the three-phase AC to DC power supply in accordance with the present invention is to be operative only above some predetermined engine speed, and the circuitry 52–58 would then be utilized as a commensurate control thereover. Otherwise, a given utilization of the present invention could ignore engine speed and operate in modes 1 through 6 even when the engine is being started up or turned off, or when it otherwise is below a normal operating speed.

In the embodiment shown in FIG. 4, the circuitry 46–58 supplies input signals to a pair of AND circuits 60, 62. If comparator 46 indicates that the output voltage is higher than the reference voltage, then the AND circuit 60 will be enabled by the signal on line 48; at the same time, there will be no output from comparator 47 on line 49, so that the AND circuit 62 will not operate. Each of the AND circuits 60, 62 can operate only when there is also present at the input thereto a clock signal on line 51, and an output signal on line 58 indicating that the system is up to operating speed. With all of these conditions met, depending upon the comparison of the output voltage on line 24 to the output of the voltage reference 44, one or the other of the AND circuits 60, 62 will operate during each clock signal. If the AND circuit 60 is operated, that indicates that the output voltage is too high and that a lower output mode should be selected. This is effected by energizing the count-down side of an up-down counter 66. On the other hand, in the event there is instead, a signal on line 49 in concurrence with a timing signal on line 51, then AND circuit 62 will operate. This is indicative of the fact that the output voltage is lower than the voltage reference and therefore that a higher voltage mode must be selected. The output of the AND circuit 62 therefore energizes a count-up input to the up-down counter 66 so as to cause the counter to count up one mode. If neither line 48, 49 has a signal during a clock pulse, then neither AND circuit 60, 62 will operate and the counter will hold its current setting.

The AND circuits 60, 62 also send signals on respective lines 61–63 to an OR circuit 67 for generating a reset signal on a line 100, the purpose of which is to reset the establishment of gate signals for the current carrying switches A–F in FIG. 1, as described more fully hereinafter. The OR circuit 67 may also respond to an inverter 68 when the inverter has no input from the voltage compare circuit 52 on line 58. Thus, the reset signal out of the OR circuit 67 is generated whenever the system is not up to operating voltage (such as an aircraft engine not being up to operating speed, as described hereinbefore), or whenever a change in mode is indicated. It should be noted that the up-down counter 66 can quite readily be counted all the way up, or all the way down, through each of its outputs, in much less than a single cycle of operation of the system. Specifically, it is possible in the present invention for the mode generator to be calling for a mode which is four or five modes removed from the mode in which the system is actually operating. But, as to any given switch, that mode cannot become initially effective during a time when the switch could conduct; instead, the gate signal for the switch will be set (into a hatch) only when the switch cannot conduct; the gate signal will then remain set (until another mode change resets it) so that the switch will conduct in succeeding cycles. However, as will become more apparent with respect to the complete description of operation, it is virtually immaterial at what rate the various modes are counted up or down in the present invention. It will also become apparent that the definition of modes, as in FIG. 4, is an arbitrary function in the present invention, and various other ways of defining one existing mode, so that a determination can be made as to which mode should be entered as a result of the voltage being too high or too low, could be utilized without altering the practice of the present invention.

Referring now to FIG. 5, the three phases from the alternator 20 are applied on the lines 26 to a three-phase transformer 74, which merely steps the voltage down so that it may be utilized as inputs to voltage compare circuits 76–78. Each of the outputs of the voltage compare circuits 76–78 is also fed through a related inverter 80–82 so as to supply the X, Y, and Z signals and their complements, referred to herein as NOT X, NOT Y, and NOT Z. It is to be noted in Table I that the overline means the complement, or NOT function: that is $\bar{x}$=NOT X.

The time points generated in FIG. 5 are applied to the select generator of FIG. 6 along with the mode definition signals generated in FIG. 4. The select generator of FIG. 6 is a straight-forward arrangement of logic circuits wherein a plurality of varying conditions may set latches, one latch corresponding to each of the main current switches A–F of FIG. 1, in dependence upon the conditions illustrated in the table, hereinbefore. For example, it can be seen in the table that gate A can be generated so as to permit operation of switch A in FIG. 1 during modes 4–6. In mode 6, the gate signals for switch A can be generated during the time period where the voltage of phase *a* is less than the voltage of phase *d* or is less than the voltage of phase *c*. This is equivalent to a time when *b* is greater than *a* or when *c* is greater than *a* and is therefore equal to the digital function: NOT X or NOT Y. Similarly, the same digital function obtains for mode 5. Therefore, in FIG. 6, if an OR circuit 84 senses either NOT X or NOT Y at the same time that an OR circuit 86 senses either mode 5 or 6, then an AND circuit 88 will cause the operation of an OR circuit 90 so as to set a latch 92, the output of which is a select signal on one of the lines 40 which will cause a generation of a gating signal for switch A (as described hereinafter). Similarly, during mode 4 an AND circuit 94 can recognize a mode 4 signal and a NOT X signal so as to cause the OR circuit 90 to operate the latch 92. Thus, the latch 92 can be set in mode 5 or 6 during the periods of the cycle identified as NOT X or NOT Y, or can be set in mode 4 during the period of a cycle defined as NOT X.

Similarly, a plurality of latches 95–99 relate to switches B–F, and generate select signals which, when properly powered up, result in the gate signals for operating the main current switches A–F in FIG. 1.

Each of the latches 92, 95–99 in FIG. 6 may be reset by a signal on the reset line 100, which is generated by the OR circuit 67 in the mode definition circuit of FIG. 4. Thus, each of these latches is reset whenever a change in mode is indicated by one of the AND circuits 60, 62, or whenever the output of inverter 68 (FIG. 4) indicates that the system is not up to speed. The resetting of the latches may occur several times in a cycle, or only once in many cycles, depending on how the output voltage compares with the voltage reference (FIG. 4).

Referring now to FIG. 7, a gated transformer 102 is used to control the application of three-phase power to a three-phase parametric rectifier 104, the output of which is used to generate a controlled gate signal on a related one of the lines 28, which supply gate signals to the main current switches in FIG. 1. The gated transformer 102 is gated in response to a related select signal on one of the lines 40, which signals are generated by the latches of FIG. 6. In other words, the select generator of FIG. 6 develops signal saying when a gate signal should be generated, and the gate generator of FIG. 7 actually generates the gate signals for application to the switches of FIG. 1.

Specifically, the phases *a*, *b*, and *c* on lines 26 of the alternator in FIG. 1 are applied to a three-phase transformer 106 (FIG. 7) so as to provide three phases of a suitable potential, *a″*, *b″*, *c″* on the plurality of lines 108. The three phases on the lines 108 are applied to a gate generator circuit respectfully relating to each of the gate A–F: the circuitry (including the gated transformer 102 and the rectifier 104) relating to gate signal A is shown in detail in FIG. 7; similarly, gate generating circuits 110, 112, respectfully relating to gate signal B and gate signal F are illustrated in block form, the remainder being broken away for simplicity. Each of the gate signal generators is similar to that shown with respect to gate signal A.

The select signal corresponding to switch A on one of the lines 40 generated in FIG. 6 by latch 92 is applied in FIG. 7 to a transistor 114, causing the transistor to conduct. This supplies a return path for a plurality of diodes 116–118 to a related triplet of diodes 119–121 so that current can conduct from the various phases on lines 108 through related primary windings 124–126 and then to correct pairs of diodes 116–121. This results in the generation of voltages across three secondary windings 128–130 which can be rectified and regulated so as to provide a fairly closely controlled gating signal for the operation of the switches A–F of FIG. 1. As illustrated in FIG. 7, the secondary windings 128–130 may be connected in delta configuration so as to supply three-phase power to the parametric rectifier 104. Across the parametric rectifier 104 is a resistor 132 in series with a Zener diode 134. This causes a very closely controlled voltage to be generated at the junction 136 between the resistor and the Zener diode, which is coupled through a resistor 138 for application to the related main current switch A (FIG. 1) over a related one of the lines 28. In operation, the generation of a select signal allows the transformer 102 to operate, so that a gate signal is generated for the related one of the main current switches. Each of the other gate generator circuits (such as circuits 110 and 112) operate in response to a related select signal from FIG. 6 so as to permit the three-phase power on lines 108 to operate a related rectifier and regulator to generate a corresponding gate signal.

The main current switches A–F illustrated in FIG. 1 are assumed, in the embodiment described hereinbefore, to be silicon controlled rectifiers, which are well-known to have the characteristic that a gate signal must be present at the time that the anode is more positive than the cathode in order for conduction to commence through the rectifier; thereafter, conduction will continue even upon the removal of the gate signal so long as the anode is positive with respect to the cathode. Current conduction ceases however, when the cathode becomes more positive than the anode. This characteristic of the silicon control rectifier allows the select generator of FIG. 6 to be reset whenever a mode change is indicated. However, if bi-polar or field effect transistors were to be utilized for current switches, A–F in FIG. 1, the reset to the latches 92, 95–99 would have to be controlled in some fashion so as to maintain the switches in an operative condition throughout the time period when the particular switch is supposed to remain operating, as shown in and described with respect to FIG. 3, hereinbefore. An exemplary embodiment of a reset circuit suitable for controlling the latches of FIG. 6 for use with bi-polar or field effect transistor switches is illustrated for switch A in FIG. 8. Therein, for instance, the reset signal for latch 92 relating to current switch A is generated by an AND circuit 120 in response to a NOT X signal on one of the lines 36 concurrently with an output from a latch 122. The latch 122 in turn is set during a period of time corresponding to X and Y once the latch 92 has been set, to generate the select A signal on one of the lines 40. This setting of the latch 122 is controlled by an AND circuit 124. Thus, whenever the switch A is selected, it will remain selected until that period of time defined by NOT X, which is the period of time when phase *b* is greater than phase *a*, which period exists between time 6 and time 3 in FIG. 3. However, the latch 122 will become set only if the latch 92 (FIG. 6) is set during the time period defined by the presence of both X and Y, which is the time when phase "*a*" is greater than phase "*b*" and phase "*c*," which is the period of time between time 4 and time 6 in FIG. 3. In other words, an AND circuit 124 will not set in the latch 122 until the useful work of the select A signal has begun, and the latch will not cause the AND circuit 120 to generate a reset signal until the useful work of the select A signal is completed, for the current cycle. If the switch A is to conduct in the next cycle, the select A latch 92 will again be set, causing latch 122 to again be set; the operation described above is then repeated. The signal on line 100*a* is applied to reset latch 92 only; similar individual reset signals may be provided for each latch 95–97 of FIG. 6, as indicated by circuits 126, 128 in FIG. 8. The logic for each reset differs, but is similar to that described hereinbefore for the reset signal on line 100*a*, and is straight forward.

In summation of the operation of the embodiments described herein, the present invention provides three-phase to DC controlled voltage generation in a fashion which is analogous to utilizing between 2 and 6 rectifying switches in the parametric three-phase rectifier used to generate the DC voltage. The choice of number of switches utilized determines how many of the six rectified phases will be utilized in any cycle, the more phases utilized the higher the DC voltage output. Operation with any given member of switches (and therefore rectified phases) is defined as a mode, and once a mode is instituted it may remain in effect indefinitely unless it is reset as a result of the output voltage varying from the reference voltage. However, whenever a given mode is initiated (and it is immaterial whether this mode calls for the operation of a switch called for in a previously initiated mode or not) the effectiveness of the mode in causing operation of any of the switches is prevented from occurring during the period when the switch has a positive anode to negative cathode relationship, whereby none of the switches are turned on except during the zero cross-over point. Thus the invention not only provides number-of-phase control (rather than percent of time conducting for all phases as in the prior art), but even the initiation of conduction of a switch is prevented from being other than for a full portion of a phase, commencing with the point where the anode first becomes positive with the cathode. Thus, radial frequency interference generation is nearly completely eliminated by the present invention.

Although the invention has been shown and described with respect to preferred embodiments thereof, it should be understood by those skilled in the art that the foregoing and various other changes and omissions in the form and detail of the invention may be made therein without departing from the spirit and scope of the invention.

Having thus described typical embodiments of my invention, that which I claim as new and desire to secure by Letters Patent of the United States is:

1. A three-phase to DC voltage adjusting power supply comprising:
   a parametric rectifying bridge comprising a plurality of selectively operable main current switches, each of said switches having a control electrode which permits conduction of the related switch in response to a signal impressed thereon;
   means defining a plurality of modes of operation for said power supply, each of said modes respectively corresponding to one of a sequence of operating conditions, each operating condition calling for the ultilization of none, some or all of said switches, respectively, whereby various ones of the maximum possible rectified waves of three-phase power available to said parametric rectifying bridge may actually be utilized, to provide correspondingly varying output voltages;
   means comparing the DC output voltage of said power supply with a reference voltage, said means providing a first signal in response to the output voltage being less than said voltage reference and providing a second signal in response to said output voltage being higher than said voltage reference;
   means responsive to said first and second signals for driving said mode defining means in corresponding directions to indicate modes relating to a higher output voltage or a lower output voltage, respectively; and
   gate means for generating respective control signals for selected ones of said switches in dependence upon the mode defined by said mode defining means.

2. The power supply according to claim 1 wherein said gate means includes means to generate signals corresponding to points in time within a cycle with respect to each of the switches in said rectifier wherein the cathode of the switch is positive with respect to the anode of the switch, and wherein said gate means initiates said control signals in response to said mode defining means and in response to a related one of said points in time signals.

3. The power supply according to claim 2 wherein said points in time signal generating means comprises means to compare the voltages of the three phases of AC input power to determine the points in time within a cycle.

4. The power supply according to claim 2 wherein:
   said gate means includes a bi-stable device for each of said switches, each causing generation of a related control signal, when set to a first one of its states, and wherein said gate means comprises means for setting each of said bi-stable means into said first state only during the presence of the related one of said points in time signals.

5. The power supply according to claim 2 wherein said points in time signal generating means is responsive to said mode defining means to generate signals indicative of times within the particular mode specified by said mode defining means when the cathode of each switch is positive with respect to the anode thereof.

6. The power supply according to claim 1 wherein said bridge comprises six main current switches, and wherein said mode defining means comprises means defining modes respectively corresponding to operating conditions calling for the utilization of 0, 2, 3, 4, 5, or 6 of said switches.

References Cited
UNITED STATES PATENTS

| | | | |
|---|---|---|---|
| 3,274,482 | 9/1966 | Depenbrock | 321—27 XR |
| 3,289,071 | 11/1966 | Rosenberry | 321—8 XR |
| 3,354,375 | 11/1967 | Poppinger et al. | 321—5 |
| 3,452,265 | 6/1969 | De Puy | 321—5 |
| 3,465,234 | 9/1969 | Phadke | 321—5 |
| 3,466,525 | 9/1969 | Ainsworth | 321—5 |

WILLIAM M. SHOOP, Jr., Primary Examiner

U.S. Cl. X.R.

321—18